United States Patent
Hassan et al.

(10) Patent No.: US 10,057,910 B2
(45) Date of Patent: Aug. 21, 2018

(54) MULTIPLEXED UNEQUAL ERROR PROTECTION FOR WIRELESS NETWORKS

(71) Applicant: Microsoft Technology Licensing, LLC, Redmond, WA (US)

(72) Inventors: Amer Hassan, Kirkland, WA (US); Aaron Cunningham, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 15/041,491

(22) Filed: Feb. 11, 2016

(65) Prior Publication Data

US 2017/0238331 A1    Aug. 17, 2017

(51) Int. Cl.
*H04J 1/00* (2006.01)
*H04W 72/10* (2009.01)
(Continued)

(52) U.S. Cl.
CPC ........... *H04W 72/10* (2013.01); *H04L 5/0007* (2013.01); *H04W 72/0453* (2013.01)

(58) Field of Classification Search
CPC ..... H04L 5/003; H04L 5/0035; H04L 5/0041; H04L 5/0044; H04L 5/0046; H04L 5/006;
(Continued)

(56) References Cited

U.S. PATENT DOCUMENTS

| 7,573,850 B2 | 8/2009 | Li et al. |
| 7,813,701 B2 | 10/2010 | Strong et al. |

(Continued)

FOREIGN PATENT DOCUMENTS

| EP | 1898543 A1 | 3/2008 |
| EP | 2153605 A1 | 2/2010 |

(Continued)

OTHER PUBLICATIONS

Hassan, et al., "Fast Prioritized Bit-loading and Subcarriers Allocation for Multicarrier Systems", In Proceedings of IEEE 71st Vehicular Technology Conference, May 16, 2010, 5 pages.

(Continued)

*Primary Examiner* — Alvin Zhu
(74) *Attorney, Agent, or Firm* — Ray Quinney & Nebeker, P.C.; Thomas M. Hardman; Miia Sula (57) ABSTRACT

Multiplexed unequal error protection for wireless networks is disclosed. A device may determine reliability associated with a first subcarrier of a channel including the first subcarrier and at least one second subcarrier. The reliability of the first subcarrier may be determined based on the position of the first subcarrier relative to each at least one second subcarrier. High priority data may be assigned to the first subcarrier for transmission if the first subcarrier is determined to have a higher reliability than the at least one second subcarrier. For example, the channel may be an orthogonal frequency division multiplexed (OFDM) channel and higher reliability may be associated with a first subcarrier that is in a middle position of the plurality of subcarriers within the OFDM channel. In another example, higher reliability may be associated with a first OFDM subcarrier that is adjacent to an unused OFDM channel bandwidth.

22 Claims, 5 Drawing Sheets

(51) Int. Cl.
*H04W 72/04* (2009.01)
*H04L 5/00* (2006.01)

(58) Field of Classification Search
CPC ... H04L 5/0064; H04B 17/309; H04B 17/345; H04B 17/373
See application file for complete search history.

(56) References Cited

U.S. PATENT DOCUMENTS

| | | | |
|---|---|---|---|
| 8,102,882 B2 | 1/2012 | Wang et al. | |
| 8,369,427 B2 | 2/2013 | Kwon et al. | |
| 2006/0171479 A1 | 8/2006 | Tee et al. | |
| 2011/0194452 A1* | 8/2011 | Orlik | H04N 19/597 370/252 |
| 2011/0261774 A1* | 10/2011 | Lunttila | H04L 5/0007 370/329 |
| 2015/0195076 A1 | 7/2015 | Sun et al. | |
| 2015/0326345 A1 | 11/2015 | Li et al. | |
| 2017/0141904 A1* | 5/2017 | Ahn | H04L 5/0055 |

FOREIGN PATENT DOCUMENTS

| | | |
|---|---|---|
| WO | 2008023963 A1 | 2/2008 |
| WO | 2008070342 A2 | 6/2008 |
| WO | 2014087146 A1 | 6/2014 |

OTHER PUBLICATIONS

Soares, et al., "A Subcarrier and Bit Allocation Algorithm for Mobile OFDMA Systems", Retrieved on: Dec. 4, 2015 Available at: https://wireless.vt.edu/symposium/2012/technicalprogram/A_Subcarrier_and_Bit_Allocation_Soares.pdf.

Hamdi, Noureddine., "Variance Based Algorithm for Grouped-Subcarrier Allocation in OFDMA Wireless Systems", In Journal of Computing Research Repository, Jul. 2012, pp. 1-5.

Pandharipande, et al., "Subcarrier Allocation Schemes for Multiuser OFDM Systems", In Proceedings of the International Conference on Signal Processing and Communications, Dec. 11, 2004, 5 pages.

Hashimoto, et al., "Channel monitor-based unequal error protection with dynamic OFDM subcarrier assignment for video transmission", In Proceedings of IEEE 56th Vehicular Technology Conference, vol. 2, Sep. 24, 2002, pp. 913-917.

"International Search Report and Written Opinion Issued in PCT Application No. PCT/US2017/016314", dated May 8, 2017, 15 Pages.

* cited by examiner

MULTIPLEXED UNEQUAL ERROR PROTECTION FOR WIRELESS NETWORKS

BACKGROUND

Wireless networks that support multiple types of wireless devices, mobile, or otherwise, have become ubiquitous in many different types of environments. For example, wireless local area networks (WLANS) are now commonly used with many types of business and personal devices, including with mobile devices of cellular systems for data traffic offload when a mobile device of a cellular subscriber is operating in the coverage area of an available WLAN. WLAN environments may include, for example, business environments in which a large number of employees using many different types of devices are supported, commercial establishments having Wi-Fi hotspots supporting customer devices, or home WLAN environments in which multiple computing devices, gaming devices, and smart televisions may be supported. Other examples of wireless networks that are commonly used include long term evolution (LTE) networks that currently form the major portion of cellular subscriber networks providing phone and data services.

A mobile device and its associated infrastructure may potentially be required to transmit and receive data traffic for a number of device applications that may be running concurrently on the mobile device. The increase in the number and in the types of mobile devices that support increasingly sophisticated device applications requires that wireless networks will need to support high speed data traffic, at higher traffic volumes, while providing a level of service and performance that is satisfactory for the users on a network.

In one example of current high speed data service implementation, WLAN and LTE networks have been implemented using orthogonal frequency division multiplexing (OFDM). In OFDM each channel used for transmission includes multiple orthogonal frequency subcarriers (subcarriers that do not interfere with one another because of orthogonality). In OFDM each subcarrier may be used to carry a separate data stream. While the subcarriers of an OFDM channel may not interfere with one another, the OFDM subcarriers may still be susceptible to interference from transmissions made on OFDM channels that are adjacent to the OFDM channel to which the OFDM subcarriers belong.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments of the disclosure provide a system, method and apparatus for allocating data for transmission on at least one channel that includes a plurality of subcarriers by allocating data to subcarriers for transmission based on the priority of the data and on the positions of the subcarriers within the at least one channel. The embodiments may include a system including one or more devices. Each device may be configured transmit data on at least one channel that includes a plurality of subcarriers by associating a priority assigned to the data with a position of a selected subcarrier of the plurality of subcarriers within the at least one channel. The data may then be transmitted on the selected subcarrier. Data for transmission having different priorities may be allocated to the subcarriers for transmission based upon the reliabilities of the OFDM subcarriers and the priorities of the data.

In one example implementation, a device may determine a reliability that is associated with a first subcarrier of a channel, where the reliability is based on a position of the first subcarrier in the channel. The channel may include the first subcarrier and at least one second subcarrier, and, the reliability of the first subcarrier may be based on the position of the first subcarrier relative to the position of each at least one second subcarrier. For example, the channel may be an orthogonal frequency division multiplexed (OFDM) channel that includes a plurality of OFDM subcarriers and higher reliability may be associated with a selected OFDM subcarrier that is in a middle position, or in one of number of middle positions, of the positions of the plurality of OFDM subcarriers within the OFDM channel. Higher priority data may then be allocated to the middle subcarrier or subcarriers of the OFDM channel and lower priority data may be allocated to the subcarriers in the edge positions for transmission. In another example implementation, it may be determined that the OFDM channel is adjacent to a neighboring channel frequency bandwidth allocated for another channel's use, but the neighboring frequency band is not used. In this case a higher reliability may be associated with a subcarrier that is in an edge position, or in one of a number of edge positions, of the positions of the plurality of OFDM subcarriers within the OFDM channel, where the edge position is adjacent to the unused channel frequency band. In this case higher priority data may then be allocated to the edge subcarrier or subcarriers of the OFDM channel adjacent to the unused channel frequency band.

In implementations of the embodiments, the data for transmission may be data that is received from one or more applications on a transmitting device, where groups of the data are prioritized relative to other groups of the data based on modality classifications of the one or more applications. The groups of data may then be allocated to subcarriers based on the priority of the data and subcarrier reliabilities that are based on the positions of the subcarriers within at least one channel available to the transmitting device. For example, data from an application may be classified into modalities such as a voice modality, a video modality and screen sharing modality. A first of these modalities may have the highest priority, a second of the modalities may have the next highest priority, and the third modality may have the lowest priority of the three modalities. In this example, the data classified in the first modality may be allocated to the most reliable OFDM subcarrier or subcarriers of an OFDM channel which may be, for example a middle sub-carrier of the OFDM channel, the data classified in the second modality be allocated to the next most reliable OFDM subcarrier or subcarriers of the OFDM channel, and the data classified in the third modality may be allocated to the subcarrier or subcarriers of the OFDM channel that have a lesser reliability.

In implementations of the embodiments, when a plurality of channels is assigned to a transmitting device where each channel includes multiple subcarriers, prioritized data for transmission may be allocated to subcarriers taken from any channel of the plurality of channels based on individual subcarrier reliability. For example, higher priority data of the data may be assigned to the higher reliability subcarriers taken from all the channels available to the device. In one example, data from an application categorized as having a high priority modality may be allocated to the middle sub-carriers of each of a plurality of channels, where the middle subcarriers have been determined to have a higher reliability than then other differently positioned subcarriers within the plurality of channels available to the transmitting device.

DETAILED DESCRIPTION

The system, method and apparatus will now be described by use of example embodiments. The example embodiments are presented in this disclosure for illustrative purposes, and not intended to be restrictive or limiting on the scope of the disclosure or the claims presented herein.

The technologies and techniques that are described herein provide embodiments of systems, methods and apparatus for allocating prioritized data for transmission on at least one channel that includes a plurality of subcarriers by allocating data to subcarriers for transmission based on the priority of the data and on the positions of the subcarriers within the at least one channel. The position of a subcarrier may be utilized to assign a reliability, which may be an estimate of reliability, to the subcarrier. Data may be allocated to the subcarriers by associating the priority of selected data with the reliability of a selected subcarrier and allocating the selected data to the selected subcarrier. The reliability of a subcarrier may an indication of the subcarrier's qualities or characteristics for carrying transmitted data accurately so the transmitted data may be received correctly by a receiving device. The reliability may be associated with any type of parameter related to a subcarrier, for example, signal to noise ratio (SNR), bit error rate (BER), packet error rate (PER) or other performance parameters that may be associated with the position of a subcarrier in a transmission channel.

The embodiments provide advantages in that prioritized data may be allocated to subcarriers included within one or more transmission channels for transmission by considering the structural positions of the subcarriers within the transmission channels. The likely reliability of each subcarrier may be determined based on its position within the transmission channel. It is not necessary to perform measurements on the subcarriers or subcarrier performance to make at least an initial subcarrier allocation. Because the positions of the subcarriers in transmission channels relative to one another are based on a set structure, an estimation of reliability of a subcarrier may be made from its position. For example, in some orthogonal frequency division multiplexing (OFDM) scenarios the middle OFDM sub-carrier of an OFDM channel may have a signal to noise ratio (SNR) that is 10 dB better than the subcarriers on the periphery of the OFDM channel. Also, it is possible that adjacent channel interference is present that makes the peripheral subcarriers of an OFDM channel less reliable than normal when a middle subcarrier, which is not as close in subcarrier frequency to the adjacent channel, would not be as affected. By considering the positions of the subcarriers of available transmission channels, and determining a reliability for one or more of the subcarriers based on the positions, high priority data may be allocated to subcarriers having high determined reliability. This provides potentially better quality service with higher throughput and less errors in the transmission of the high priority data. Also, lower priority data may be allocated to subcarriers having lower determined reliability for transmission. This frees up the higher reliability subcarriers for higher priority data and further increases the throughput and error reduction for the higher priority data.

Example implementations in which the embodiments provide technical advantages may be used in wireless networks in which subcarriers are affected by interference caused by channels adjacent to the channel that includes the affected subcarriers. In current OFDM networks such as Wi-Fi networks operating according to the IEEE 802.11a or 802.11b/g standards, adjacent channel into may be reduced by use of OFDM channels having non-overlapping, frequency spectrum with one another for neighboring network access points (APs). However as the number of Wi-Fi networks and network user numbers increase, it may not be feasible for a network operator to avoid using adjacent OFDM channels that overlap in frequency spectrum. In this case the position of a subcarrier within a transmission channel may significantly affect how interference from channels adjacent to the transmission channel impacts the reliability of the subcarrier.

The embodiments may also be utilized for initial allocation of prioritized data to subcarriers when a device begins initial transmissions. This may include for example, utilizing embodiments of the disclosure for a default or initial allocation of subcarriers, then monitoring transmission channel performance, and only changing the initial allocation if the reliability of the transmission configured in the initial allocation falls below a certain threshold.

The example implementations provide an advantage over methods in which the allocation of data is only done on a transmission channel level without considering the individual reliability of subcarriers that comprise the transmission channel. The implementations allow advantage to be taken of knowledge of the subcarrier positioning to allow the higher priority data to be transmitted on the most reliable subcarriers of the transmission channel. The implementations may also be utilized in a combination with methods that allocate transmission channels for data transmissions based on a transmission channel reliability that includes its subcarriers as a whole. In this combination the embodiments allow a further refinement and improvement of transmission channel reliability by utilizing the individual subcarriers reliabilities. For example, if a transmitting device is assigned a high reliability transmission channel, a higher reliability may be achieved for the higher priority data bits the device transmits by allocating the higher priority data bits to the higher reliability subcarriers based on the subcarrier positions in the transmission channel. This prevents adverse effects on data transmissions that may be caused when both higher and lower priority data bits are allocated across subcarriers of the transmission channel without considering the reliability of the subcarriers.

Figure 1A:
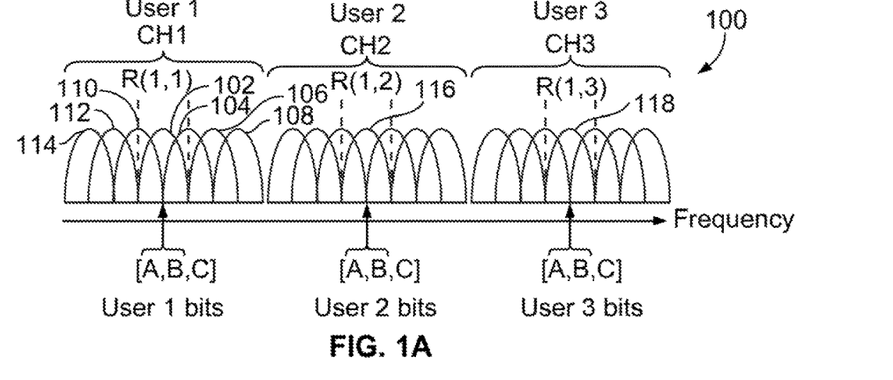
FIG. 1A is a diagram showing example orthogonal frequency division multiplexing channel and subcarrier allocations to transmissions of multiple users for multiplexed unequal error protection.

Referring now to FIG. 1A, therein is a diagram showing example OFDM channel and subcarrier allocations to transmissions of multiple users in a wireless network for multiplexed unequal error protection. FIG. 1A shows three users, user 1, user 2, and user 3, that are allocated OFDM channels CH1, CH2, and CH3, respectively, for data transmissions. Each OFDM channel is assigned a frequency band of a bandwidth, BW, on the frequency axis of diagram 100. Each of OFDM channels CH1, CH2, and CH3 includes a plurality of any number of subcarriers. In the example of FIG. 1A, channel CH1 is shown having subcarriers 102, 104, 106, 108, 110, 112, and 114. CH2 and CH3 are shown with a similar configuration. The subcarriers of channels CH1, CH2 and CH3 are overlapping to maximize spectral efficiency and are orthogonal to one another. Subcarrier 102 is positioned as a middle channel of the subcarriers in the frequency band width of CH1, and subcarriers 108 and 114 are positioned as edge channels in the frequency band width of CH1. Subcarriers 104, 106, 110 and 112 are positioned in the frequency bandwidth between the middle and edge subcarrier positions. A middle positioned subcarrier in each of CH1, CH2, and CH3 is assigned a reliability indicated by R(1) based on its position. In the example of FIG. 1A, a reliability of R(1) may indicate that a subcarrier has a highest or best estimated reliability of the sub-carriers in its channel, CH1, CH2, or CH3. The middle positioned subcarrier may be any subcarrier or group of subcarriers positioned in the middle portion of the channels CH1, CH2, or CH3 that may exhibit high reliability because of its position and may be other than the exact middle subcarrier. The reliability assigned to a subcarrier may range from R(1) to R(N). N may be the number of subcarriers in a channel if each one is to have a different level of reliability, or may be a number N of reliability groups of subcarriers that may be assigned to a same level of reliability in a channel. In some implementations only one level R(1) may be used to indicate the best subcarrier or subcarriers. In FIG. 1A each of user 1, user 2, and user 3 are shown having user data bits grouped into priority categories A, B, and C. In the example of FIG. 1A, data bits grouped into categories A and B have higher priority than bits in category C. The categories A, B, and C may represent data from one or more applications operating on devices of user 1, user 2, or user 3. For example, the user 1 bits may comprise data bits from a conferencing application on the device of user 1, where bits in group A carry audio, bits in group B carry video and bits in group C carry screen sharing data. In FIG. 1A the user 1 bits in group A and B have a higher priority than group C bits and are therefore allocated to the higher reliability subcarrier 102 of CH1 for transmission. The allocation may be implemented using a priority that allocates user 1 group A and B bits to subcarrier 102 on a priority basis. For example, if capacity is not available on subcarrier 102, the bits of group A and B that cannot be allocated to subcarrier 102, may be allocated randomly to the remaining subcarriers if only one reliability level R(1) is used. Alternately, the bits of group A and B that cannot be allocated to subcarrier 102 may be allocated in a prioritized manner to the other subcarriers of channel CH1, such as by first allocating to subcarriers having a reliability R(2), then, if necessary to subcarriers having a reliability R(3). The data bits in group C have least priority and may be allocated last, or may be allocated to edge subcarriers 108 and 114. Allocation of the data bits for user 2 and user 3 may be done in a similar manner as is done for user 1 or, alternately, may be done in a different manner according to the preferences of user 2 or user 3. For example, data applications in use by user 2 may allow user 2 to set priorities for transmitted application data, and user 2 may choose different priorities for categories of data than is used by user 1.

Figure 1B:
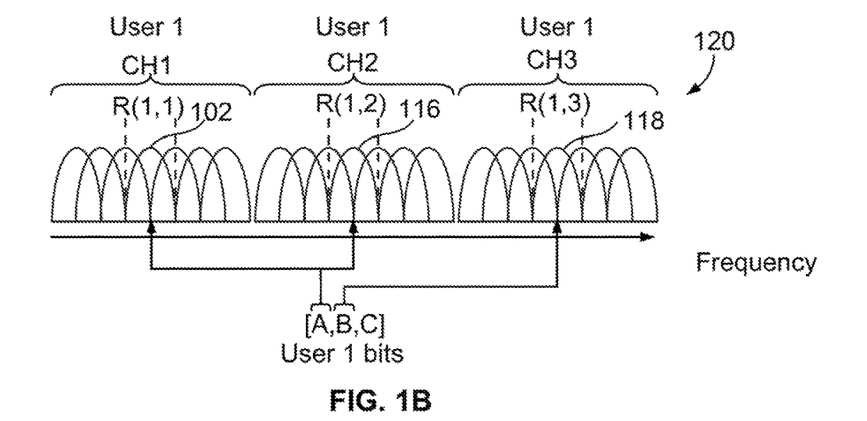
FIG. 1B is a diagram showing an example orthogonal frequency division multiplexing channel and subcarrier allocation to transmissions of a user for multiplexed unequal error protection.

Referring now to FIG. 1B, therein is a diagram showing an example orthogonal frequency division multiplexing channel and subcarrier allocation to transmissions of a user for multiplexed unequal error protection. FIG. 1B shows an example allocation of subcarriers to user 1 when user 1 has been assigned multiple channels, CH1, CH2, and CH3 for transmitting data. In each of channels CH1, CH2, and CH3, a middle positioned subcarrier 102, 116, and 118, respectively, has been assigned a reliability, R(1,1), R(1,2) and R(1,3), respectively, based on its position. The reliability assigned the subcarriers may be designated by R(x,y), where x is a level of reliability of 1 to N, where 1 is the highest, and y indicates the Channel number. For example, in FIG. 1B, subcarrier 102 has been assigned reliability R(1,1) meaning reliability level 1 on CH1. In other example implementations in which a user is assigned multiple channels such as CH1, CH2 and CH3, the channel indicator y may be left out and a reliability level may be assigned to each subcarrier without distinguishing the channel number. The channel indicator y may be used when it is desirable to distinguish between channels, such as when a user device has knowledge that one channel overall, including all its subcarriers, is more reliable than the other available channels. N may be the number of subcarriers in a channel if each one is to have a different level of reliability, or may be a number N of reliability groups of subcarriers that may be assigned to a same level of reliability in a channel. In FIG. 1B, user 1 data bits categorized into priority groups A, B, and C are allocated on a priority basis to subcarriers 102, 116, and 118 of channels CH1, CH2, and CH3, respectively. The user 1 bits in group A and B have a higher priority than group C bits and are therefore allocated to subcarriers 102, 116 and 118 for transmission. In FIG. 1B each of subcarriers 102, 116, and 118 have the same reliability level 1. For example, the allocation may be implemented using a priority that allocates group A and B bits of user 1 to a first subcarrier of subcarriers 102, 116, and 118 on a priority basis. If capacity is not available on the first subcarrier of subcarriers 102, 116, and 118, the bits of group A and B that cannot be allocated to the first subcarrier, may be allocated in a prioritized manner to a second subcarrier of subcarriers 102, 116, and 118, and, if necessary to a third subcarrier of subcarriers 102, 116, and 118. The data bits in group C have least priority and may be allocated last according to the reliability of subcarriers having remaining capacity, or may be allocated to edge subcarriers of the channels CH1, CH2, and CH3. The order in which the first, second and third subcarriers are chosen from subcarriers 102, 116, and 118 may be a random choice, or may be based on relative desirability of using channels CH1, CH2, and CH3 and the channel indicator associated with the reliability.

Figure 1C:
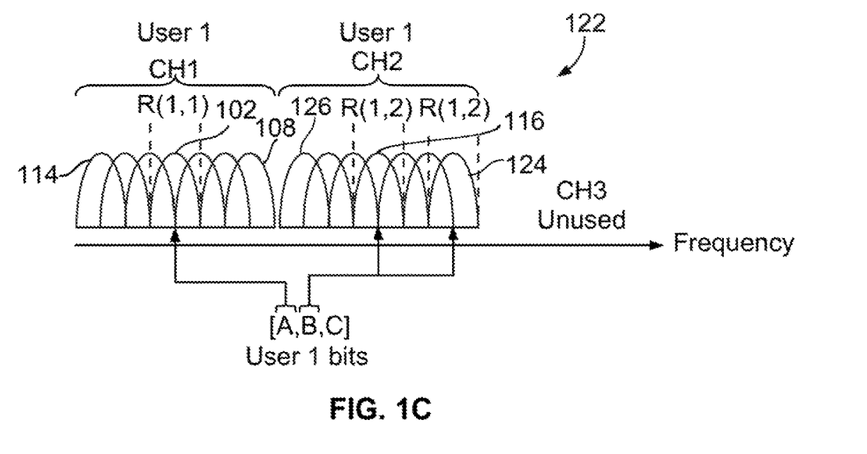
FIG. 1C is a diagram showing a further example of a orthogonal frequency division multiplexing channel and subcarrier allocation to transmissions of a user for multiplexed unequal error protection.

Referring now to FIG. 1C, therein is a diagram showing an example of a orthogonal frequency division multiplexing channel and subcarrier allocation to transmissions of a user for multiplexed unequal error protection when an unused channel bandwidth is adjacent to a channel allocated to the user. In FIG. 1C user 1 has been assigned channels CH1 and CH2, and CH3 is unused by the network and/or unused by neighboring networks. The determination that CH3 is unused or currently unused may be made, for example, by receiving information from other devices or a network coordinating function in the network, or neighboring networks, that may use CH3 where the information indicates to the device of user 1 that CH3 is unused. Alternately, the determination that CH3 is unused may be made by monitoring the bandwidth over a time period and making the determination based on information from the monitoring.

In FIG. 1C, a reliability R(1,2) has been assigned to edge positioned subcarrier 124 and also to middle positioned subcarrier 116. This indicates that subcarriers have the highest level of reliability and are on CH2. Also a reliability R(1,1) has been assigned to middle positioned subcarrier 102 of CH1 indicating that subcarrier 102 has the highest level of reliability and is on CH1. In FIG. 1C, user 1 data bits categorized into priority groups A, B, and C are allocated on a priority basis to subcarriers 102 of channel CH1, and subcarriers 116, and 124 of channel CH2. The user 1 bits in group A and B have a higher priority than group C bits and are therefore allocated to subcarriers 102, 116 and 124 for transmission. In an implementation of FIG. 1C each of subcarriers 102, 116, and 124 may have the same reliability level for bit allocation. For example, the allocation may be implemented using a priority that allocates group A and B bits of user 1 to a first subcarrier of subcarriers 102, 116, and 124 on a priority basis. If capacity is not available on the first subcarrier of subcarriers 102, 116, and 124, the bits of group A and 13 that cannot be allocated to the first subcarrier, may be allocated in a prioritized manner to a second subcarrier of subcarriers 102, 116, and 124, and, if necessary to a third subcarrier of subcarriers 102, 116, and 124. The order in which the first, second and third subcarriers are chosen from subcarriers 102, 116, and 124 may be a random choice, or may be based on relative desirability of using channels of CH1 or CH2 and the channel indicator associated with the reliability. In one example, on the basis the CH2 is adjacent an unused channel bandwidth and has higher an estimated reliability, the subcarriers of CH2, i.e., subcarriers 116 and 124, may be allocated the priority bits first and then, if necessary, remaining higher priority bits may be allocated to subcarrier 102 on CH1. The data bits in group C have least priority and may be allocated last according to the priority of subcarriers having remaining capacity, or may be allocated to edge subcarriers 114 or 108 of CH1, or edge subcarrier 126 of CH2.

While FIGS. 1A, 1B and 1C show implementations with seven subcarriers per OFDM channel, the embodiments may be implemented in networks using any number of channels having any number of subcarriers. For example, in one example implementation the network may operate according to the IEEE 802.11g standard, in which each OFDM channel occupies 16.25 MHz of bandwidth at the 2.4 GHz frequency range, and each OFDM channel is divided into 52 subcarriers, each of 312.5 kHz in bandwidth. These subcarriers overlap to utilize the 16.25 MHz channel bandwidth dedicated per channel. Other example implementations may be utilized in networks operating according to the OFDM specified in the IEEE 802.11a, IEEE 802.11b, IEEE 802.11ac and/or 802.11b Wi-Fi standards, each of which uses varying forms of OFDM in various frequency ranges. Other implementations may be utilized in any other type of wireless network in which a transmission channel is configured with multiple subcarriers or subcarriers that carry data for the transmission channel, including, for example, cellular systems such as the long term evolution (LTE) OFDM system specified in the 3GPP standard "TS 36.211 Evolved Universal Terrestrial Radio Access (E-UTRA); Physical channels and modulation", digital audio broadcast (DAB) systems, digital video broadcast (DVB) systems, and other OFDM systems.

Figures 2A, 2B:
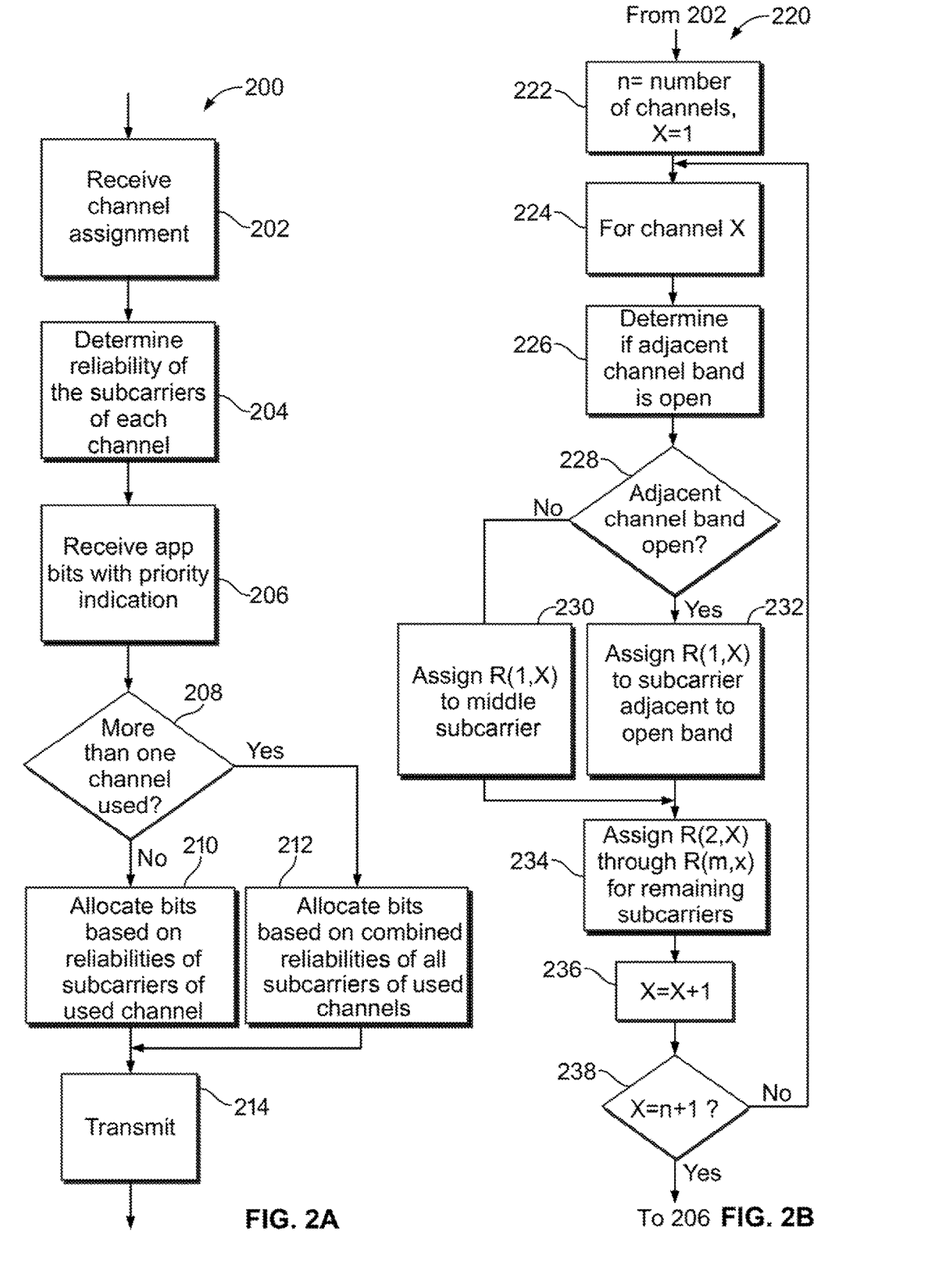
FIG. 2A is a flow diagram showing example operations in a wireless network for an embodiment of multiplexed unequal error protection.
FIG. 2B is a flow diagram showing example operations for determining subcarrier reliability.

Referring now to FIG. 2A, therein is a flow diagram 200 showing example operations in a wireless network for an embodiment of multiplexed unequal error protection. The operations shown in FIG. 2A may be performed in any device that is transmitting data on transmission channels that include subcarriers. This may include a mobile device transmitting data to network access devices, such as access points (APs) or cellular base stations, or network access devices, such APs or cellular base stations, transmitting data to mobile devices. FIG. 2A may be explained using an example of an device operating in an OFDM network.

The process of FIG. 2A begins at 202 where the device receives a channel assignment. The channel assignment may be an OFDM channel list including one or more OFDDM channel that is received from the network, or in some other implementations may be an OFDM channel list including one or more OFDM channel that is determined and assigned within the transmitting device itself.

Next, at 204 reliabilities of one or more of the subcarriers of the assigned OFDM channels are determined. In an embodiment, the reliability of a subcarrier may be determined based on information relating to its position within the OFDM channel in which it is included. In one example implementation, the device may determine the subcarrier reliabilities from reliabilities assigned by the device to subcarriers, where the assignments are based on information in the device that relates to the positions of the sub carriers. In another example implementation the device may determine the subcarrier reliabilities from subcarrier reliabilities assigned at the network, from information in the network that relates to the positions of the sub-carriers, where the reliabilities are transmitted to the device from the network. One example implementation of 204 may be explained with reference to FIG. 2B.

FIG. 2B is a flow diagram showing example operations for assigning subcarrier reliability. The operations of FIG. 2B may be implemented within a transmitting device, such as a mobile device or network access point, or in alternative implementations, may be implemented and performed elsewhere in a network, for example at a network controller. The process of FIG. 2B begins at 222 where a value n is set to the number of OFDM channels, a value y is set to the number of subcarriers of each OFDM channel, and a value of a OFDM channel index, x, is set to 1. The index x may be an index for keeping track of which OFDM channel is currently being processed in FIG. 2B. If only one OFDM channel is being used n and x both equal 1 and the process will be performed only once for that channel. Next, at 224, the process is begun for a first (denoted by the current value of x=1) OFDM channel of then OFDM channels. in some implementations the value y may be set to a number that is a number of groups of subcarriers and the subcarriers may be handled in groups. For example, rather than an individual middle subcarrier being assigned a reliability, a group of middle positioned subcarriers or group of edge positioned subcarriers of the OFDM channel may be assigned the same priority together.

At 226 a determination is made as to whether an OFDM channel band adjacent to the first OFDM channel is open, i.e., is currently unused. The determination as to whether a OFDM channel band adjacent to the first OFDM channel is open may be made, for example, by receiving information from other devices or a network coordinating function in the network, or from devices or network control functions in neighboring networks, that may use any channels adjacent to the first channel, where the information indicates that an adjacent channel is unused. In some embodiments, the information on adjacent channels may comprise information on use of adjacent OFDM channels that have a frequency band that overlaps the frequency band of the first channel. The information on adjacent channels may include time periods indicating when the adjacent channels are not used, for example, from a channel use coordinating function. In alternate implementations, the determination as to whether an OFDM channel band adjacent or overlapping channel relative to the first OFDM channel is open may be made at the transmitting device, or by its network, by monitoring the bandwidth over a time period and making the determination based on information from the monitoring. In another alternate implementation, the determination as to whether an OFDM channel band adjacent or overlapping channel relative to the first OFDM channel is open may be made at the transmitting device, or by its network, by monitoring one or more edge subcarriers of the first OFDM channel over a time period, and making the determination based on information from the monitoring that shows the edge channels exhibit reliability above a threshold level. If it is determined that an adjacent channel is not used the process moves to 230, otherwise the process moves to 232.

If it had been determined that the adjacent channels are used and the process moved to 230, at 230, a reliability of R(1,x) is assigned to one or more middle subcarriers of the OFDM channel indicated by the OFDM channel index, x, currently being processed. This indicates that the one or more middle subcarrier of OFDM channel x has a reliability level of 1. If had been determined that an adjacent channel is not used and the process moved to 232, at 232 a reliability of R(1,x) is assigned to one or more edge subcarriers of the OFDM channel indicated by the OFDM channel index, x, currently being processed, where the edge subcarriers are adjacent to the unused channel band. This indicates that the one or more edge subcarriers of OFDM channel x has a reliability level of 1. Next, from either 230 or 232, the process moves to 234.

At 234 the remaining y−1 subcarriers or subcarrier groups of the OFDM channel indicated by the index x are assigned reliabilities. Operation 234 of FIG. 2B shows an implementation in which each of the remaining subcarriers for OFMD channel x is assigned a reliability selected from R(2,x) through R(m,x), where m is the number of available reliability levels. In one example embodiment, m may equal 2 and a second level reliability, R(2,x), may be assigned to all of the remaining subcarriers. In this implementation there would then be two reliability levels for the subcarriers or groups of subcarriers on OFDM channel, x, with the subcarriers having R(1,x) being determined to be more reliable than the subcarriers having reliability R(2,x) for OFDM channel x. In another example embodiment, m may be any number of reliabilities may be assigned based on subcarrier positions or estimated reliability.

In some embodiments the assigned reliabilities may be designated by R(m), without a OFMD channel index x, if there is only one OFDM channel, or there is not a need to distinguish between OFDM channels when assigning prioritized bits to available subcarriers. In these embodiments all the subcarriers from all the OFDM channels are assumed to have equal reliability. For example, a middle subcarrier of an OFDM channel, where the subcarrier has a reliability R(1), may be considered to have equal reliability to a middle subcarrier of another OFDM channel having reliability R(1) when prioritized bits are allocated for transmission. The OFDM channel index x may be used to distinguish between ODM channels, for example, if a subcarrier having reliability R(1,1) on a first OFDM channel should be treated as being preferred for use over a subcarrier having reliability R(1,2) on a second OFDM channel, when prioritized bits are being allocated to the subcarriers of the first and second OFDM channels. For example, a middle subcarrier of one OFDM channel may be preferred over a middle subcarrier of another OFDM channel because of differences at the OFDM channel level.

Next, at 236, the OFDM channel index x is incremented. Then at 238 it is determined if reliabilities have been assigned for all OFDM channels by comparing the OFMD channel index x with n+1. The operations 222-238 will be cycled through once for each OFDM channel being assigned subcarrier reliabilities. In some implementations if a device is assigning reliabilities to subcarriers of a single OFDM channel the OFDM channel index need not be used and operations 222, 224, 236 and 238 maybe omitted. If x=n+1 all OFDM channels have been processed and the process returns to 204 of FIG. 2A.

Referring again to FIG. 2A, at 204 the transmitting device receives data bits for transmission with a priority indication. The bits may be received from an application operating on the transmitting device when the transmitting device is, for example, a mobile device operating in a network. Alternately in the case of when a network access device is the transmitting device, for example an AP or cellular base station, the bits may be received from the network for transmission to a mobile device. The bits may be received for transmission categorized into priority groups where the priority of the groups in indicated in information available to the subcarrier allocating functions of the transmitting device. High priority bit groups may include, for example, bits that carry video and speech for one or more applications operating on a device. Low priority bit groups may include, for example, bits that carry data for instant messaging or push notifications. The bits may be allocated to subcarriers separately for a single application or as a combined bit stream of one or more applications. One example of prioritized data may be data from a speech codec application where the speech codec encodes data differently depending on the data's importance. For example when the most significant bits (MSBs) of a code word including speech data are coded by forward error correction (FEC) code using a stronger code than is used for the least significant bits (LSBs) of the code word, the MSB data may have a higher priority than the LSB data from the codec. The higher priority MSB data may be allocated to a highest reliability subcarrier, or subcarriers of one or more OFDM channels.

Next, at 208, it is determined if more than one OFDM channel has been assigned. If only one OFDM channel has been assigned the process moves to 210. if more than one OFDM channel has been assigned the process moves to 212.

If only one OFDM channel is assigned, the prioritized bits are allocated at 210, to subcarriers for transmission based on the reliability of the subcarriers of the assigned OFDM channel and the priority of the prioritized bits. In one example implementation of operation 210, the allocation of the bits to the subcarriers may be done as described for user1 in FIG. 1A. If more than one OFDM channel is assigned, the prioritized bits are allocated, at 212, to subcarriers based on the combined reliabilities of all the subcarriers of the assigned OFDM channels. In one example implementation of operation 212, the allocation of the bits to the subcarriers may be done as described for user 1 in FIGS. 1B and 1C.

Figure 3:
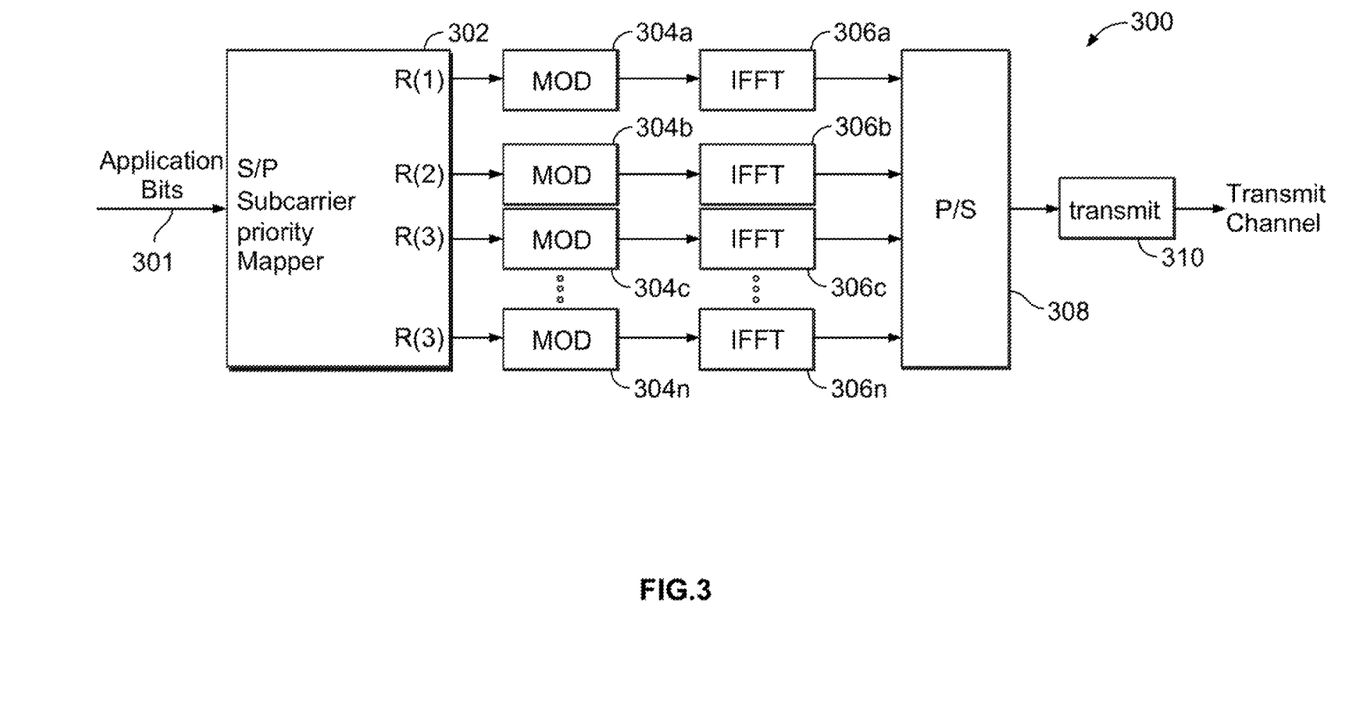
FIG. 3 is a simplified block diagram showing an example functional architecture for a device according to the disclosure.

Referring now to FIG. 3, therein is a simplified block diagram showing an example of transmitting functions for a device 300 according to an embodiment. Device 300 includes data transmitting functions of serial to parallel (S/P) subcarrier priority mapper 302, modulators (MOD) 304a-304n, Inverse fast Fourier Transform (IFFT) blocks 306a-306n, parallel to serial (P/S) converter, and transmit block 310. The transmitting function utilizes n subcarriers a-n, which are represented by the parallel streams comprising MODs 304a-304n and IFFT blocks 306a-306n, respectively.

In an example implementation, transmitting functions of device 300 may be may configured to implement the process of FIG. 2A. S/P subcarrier priority mapper 302 receives data bits at interface 301 for transmission on an assigned transmission channel using n subcarriers a-n. S/P subcarrier priority mapper 302 converts the serial data bit-stream received at interface 302 into parallel bit-streams divided among the individual subcarriers a-n. The data bits may be from one or more applications on device 300. The data bits may be received at S/P subcarrier priority mapper 302 with indications of priority, or relative priority, of bits or groups of bits of the received data bits. S/P subcarrier priority mapper 302 has information on the reliabilities of the subcarriers. The reliabilities of the subcarriers a-n may be determined by S/P subcarrier priority mapper 302 based on transmission channel and subcarrier position information or, for example, received from other functions in device 300, or from another device in the network, that has determined the reliabilities based on subcarrier position information within the transmission channel.

In FIG. 3, S/P subcarrier priority mapper 302 has assigned reliabilities R(1)-R(3) to each of the subcarriers a-n, respectively. The reliabilities are shown in the implementation of FIG. 3 with each subcarrier having a reliability having a differing reliability. R(1) represents highest reliability, R(2) represents next level reliability, R(3) represents a third level of reliability. For example, subcarrier a may be a middle positioned subcarrier assigned the highest reliability R(1), subcarrier b may be positioned intermediately between the middle and edge positions of the subcarriers and be assigned a reliability R(2), and subcarriers 3 through n may be edge positioned subcarriers relative to subcarriers a and b and may be assigned a reliability R(3). The data bits received at interface 301 are mapped by S/P subcarrier priority mapper 302 by allocating the bits to an appropriate subcarrier based on the priorities of the data bits and the reliabilities of the subcarriers. In the example implementation, the highest priority bits may be allocated to subcarrier a, the lowest priority bits may be allocated to subcarrier c through n, and the middle priority bits may be allocated to subcarrier b.

Once the data, bits have been divided among the individual sub-carriers by S/P subcarrier priority mapper 302, each subcarrier a-n is modulated at MODs 304a-304n and IFFTs 306a-306n, respectively, as if it was an individual channel before all subcarriers are combined back together at P/S 308 and transmitted as a whole on the transmit channel by transmit function 310. At a receiving device, the receiver performs the reverse process to divide the incoming signal into the appropriate sub-carriers and then demodulates the subcarriers individually to reconstruct the original data bits.

Figure 4:
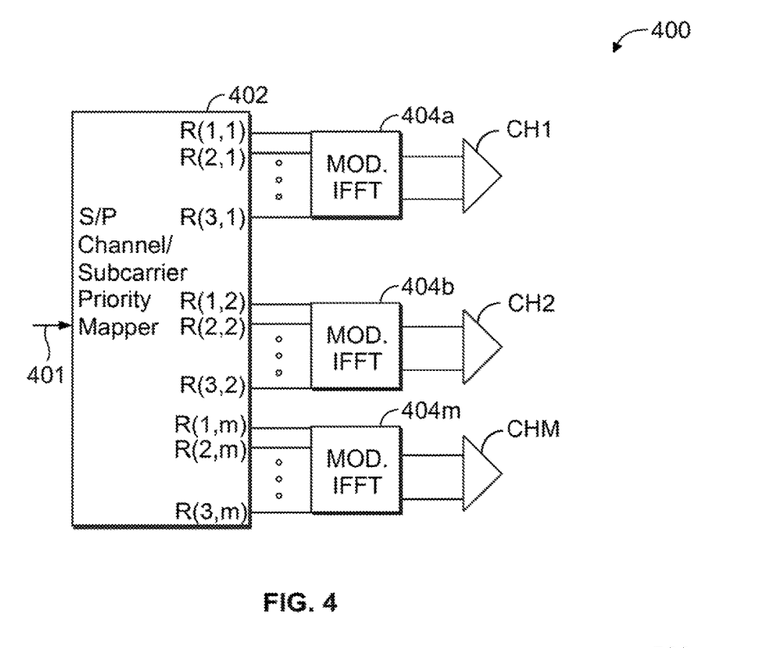
FIG. 4 is a simplified block diagram showing another example functional architecture for a device according to the disclosure.

Referring now to FIG. 4, is a simplified block diagram showing another example functional architecture for a device 400 according to the embodiment. Device 400 includes serial to parallel (S/P) channel/subcarrier reliability mapper 402, modulation and IFFT (MOD/IFFT) functions 404a-404m for each of m transmission channels CH1-CHm, respectively. Each of MOD/IFFT functions 404a-404m may be configured to process multiple subcarriers, such as the multiple subcarriers of FIG. 3, for a single transmission channel and each transmission channel of CH1-CHm may be equivalent to the transmission channel of FIG. 3. In the example implementation of FIG. 4, prioritized data bits are received at interface 401 by S/P channel/subcarrier reliability mapper 402. The data bits may be received with indications of priority, or relative priority, of bits, or groups of bits, of the received data bits. S/P channel/subcarrier reliability mapper 402 has information on the reliabilities of the subcarriers. S/P channel/subcarrier reliability mapper 402 may also have information on the reliabilities or preferences of use for the transmission channels CH1-CHm.

In FIG. 4, S/P channel/subcarrier reliability mapper 402 has assigned reliabilities R(1,1), R(2,1) or R(3,1) to the subcarriers of CH1 for processing by MOD/IFFT 404a based on subcarrier position in CH1. R(1,1) means a subcarrier has the highest reliability of level 1 on CH1, R(2,1) means a subcarrier has the next highest reliability of level 2 on CH1, and R(3,1) means a subcarrier has the lowest reliability of level 3 on CH1. The levels of reliability may be determined from the position of a subcarrier as was described for FIG. 3 and as shown in FIGS. 1A and 1B. The reliabilities R(1,2), R(2,2) or R(3,2) are assigned to each of the subcarriers of CH and reliabilities of R(1,m), R(2,m) or R(3,m) are assigned to each of the subcarriers of CHm in a similar manner. The data bits received at interface 401 are mapped by S/P channel/subcarrier reliability priority mapper 402 by allocating the bits to an appropriate channel and subcarrier of that channel based on the priorities of the data bits and the reliabilities of the subcarriers. In some implementations each of CH1-CHm may be equally preferred for use, in which case the highest priority bits may be allocated to the subcarriers having the highest reliability level 1, R(1, 1), R(1,2) to R(1,m), selected from all subcarriers across all transmission channels CH1-CHm. The lowest priority bits may be allocated to the subcarriers having the lowest reliability level of 3, R(3, 1), R(3,2) to R(3,m), selected from all transmission channels CH1-CHm, and the middle priority bits may be allocated to the subcarriers having the middle reliability level R(2,1), R(2,2) to R(2,m) selected from all transmission channels CH1-CHm. In this case the reliabilities may be designated as R(1), R(2) to R(3) without using the second index. In other implementations certain transmission channels of CH1-CHm may be more preferred for use and S/P channel/subcarrier reliability priority mapper 402 may allocate data bits first to one transmission channel, such as CH1, based on subcarrier reliability, and then to other transmission channels, sequentially.

Figure 5:
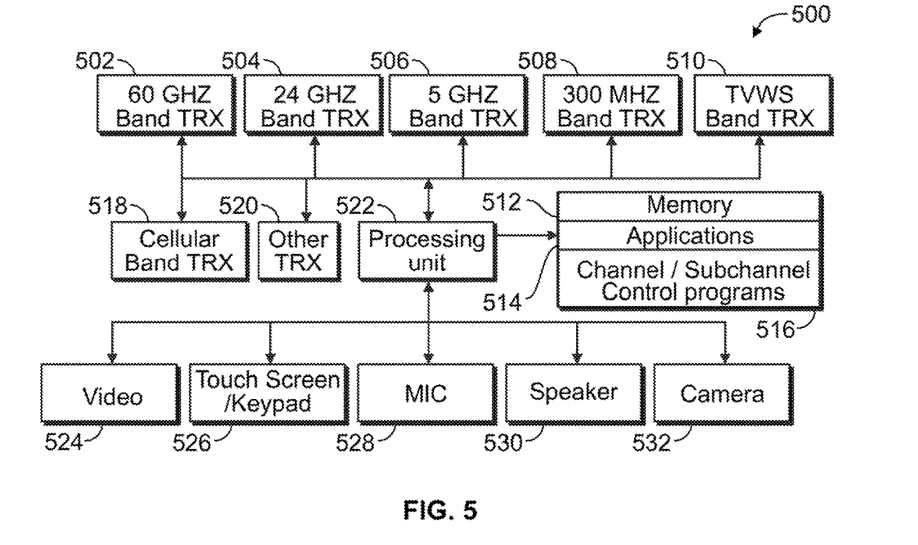
FIG. 5 is a simplified block diagram showing an example mobile device implementation according to the disclosure.

Referring now to FIG. 5, therein is a simplified block diagram of an example wireless communication device 500 which may be implemented, for example, using OFDM transmission according to FIGS. 3 and 4. Device 500 represents a possible implementation of a device that may operate, according to the embodiments of the disclosure. Device 500 may also represent any type of device configured with more or less of the functionality shown in FIG. 5.

These types of devices may include, for example, smart phones, laptop computers, tablet devices, desktop computers, gaming devices, media devices, smart televisions, home theater systems, smart automobile systems, smart house systems, multimedia cable/television boxes, smart phone accessory devices, tablet accessory devices, personal digital assistants (PDAs), portable media players, smart watches, smart sensors, or industrial control systems.

Device 500 may include user interfaces which may include any type of interface, for example, video display 524, touch screen/keypad 526, microphone 528, speaker 530 or camera 532 which receive inputs and provide outputs to and from device 500. Device 500 includes processing unit 522 and memory 512 which is shown as including program code or instructions for channel/subcarrier control programs 516 that perform functions according to the embodiments. For example, in an implementation, the device may be configured so that execution of the channel/subcarrier control programs causes processing unit 522 to implement the functions of subcarrier reliability mapper 302 of FIG. 3 or channel/subcarrier reliability mapper 402 of FIG. 4 to allocate prioritized data bits to OFDM channels and subcarriers for transmission by device 500. Processing unit 522 may comprise one or more processors, processing units, other control circuitry, or, any circuit or combination of processors and control circuitry that provide overall control of device 500 according to the disclosed embodiments. Memory 512 may be implemented as any type of computer readable storage media in device 500, including non-volatile and volatile memory. Memory 512 also includes application programs 514. Memory 512 may also include operating system programs and data such as media data, camera photos and videos, contact data, calendar data, and other files used in the operation of applications on device. Processing unit 522 provides overall control of device 500 and the other functional blocks shown in FIG. 5 by executing instructions and code in memory 512 to implement communications with other wireless devices and network access devices, such as APs or cellular base stations.

Figure 6:
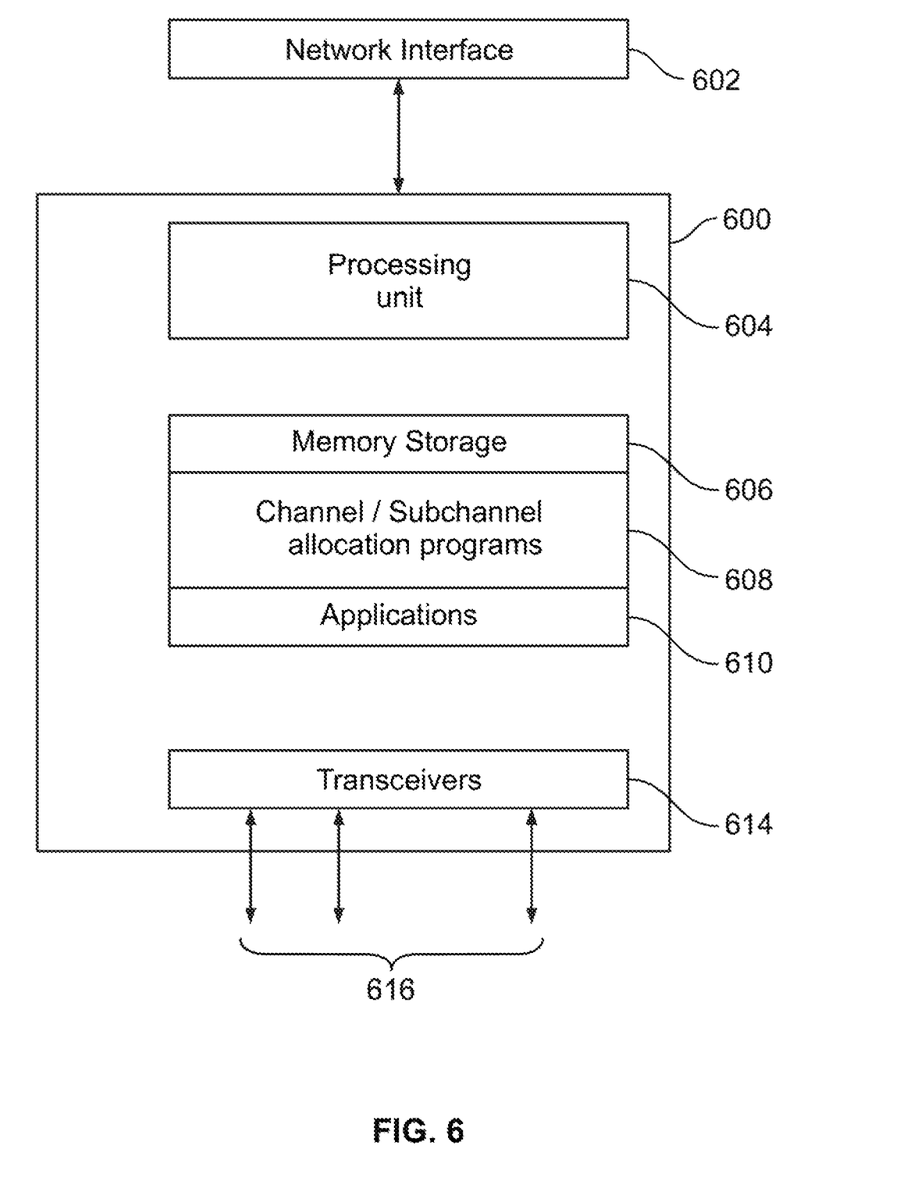
FIG. 6 is a simplified block diagram showing an example network access device implementation according to the disclosure.

In the example of FIG. 5, device 500 includes one or more transceivers configured to communicate with APs on channels using the 60 GHz Band TRX 502, 2.4 GHz TRX 504, 5 GHx Band TRX 506, 300 MHz Band TRX 508, 54-698 MHz TVWS Band TRX 510, and cellular band TRX 518. In embodiments device 500 and its transceivers may be operable to use one or more spectrum allocations according to any relevant IEEE 802.11 or any other standard specifications supported by device 500. Implementations of device 500 may be utilized, for example, in networks operating according to the OFDM specified in the IEEE 802.11a, IEEE 802.11b, IEEE 802.11ac and/or 802.11b Wi-Fi standards. In these implementations device 500 may be configured to perform functions of subcarrier reliability mapper 302 of FIG. 3 or channel/subcarrier reliability mapper 402 of FIG. 4 according to the operations of FIGS. 2A and 2B, when transmitting data. Also, transceivers 510 may use currently available TVWS channels according to requirements and regulations of the geographic area and networks in which it may operate. Transceiver 518 may also be configured to allow device 500 to operate in a OFDM cellular system, such as an LTE system Referring now to FIG. 6, therein is a simplified block diagram of an example network access device 600. Device 600 may represent a network access device, such as a Wi-Fi AP, or a base station of a cellular system, for example a LTE system. Device 600 includes processing unit 604, transceivers 614, and memory/storage 606 that includes code and instructions for channel/subcarrier allocation programs 608 and applications 610. Memory 606 may be implemented as any type of as any type of computer readable storage media, including non-volatile and volatile memory. Device 600 connects to a backend network over network interface 602. Processing unit 604 may comprise one or more processors, or other control circuitry or any combination of processors, circuits, and control circuitry that provide overall control of the device 600 according to the disclosed embodiments. Transceivers 616 provide the capability for device 600 to communicate with devices, such as device 500, over RF channels according to network protocols. Processing unit 604 provides overall control of device 600 and the other functional blocks shown in FIG. 6 by executing instructions and code in memory 606 to implement communications with devices and network control devices, and provide functions for a network.

Device 600 may be configured to perform functions of subcarrier reliability mapper 302 of FIG. 3 or Channel/subcarrier reliability mapper 402 of FIG. 4 according to the operations of FIGS. 2A and 2B, when transmitting data to devices, for example device 500 of FIG. 5 operating in a network or system. In an implementation, execution of channel/subcarrier allocation programs 608 causes processing unit 604 to perform operations that cause functions of device 600 to perform appropriate operations according to FIGS. 2A or 2B. Implementations of device 600 may be utilized, for example, in networks operating according to the OFDM specified in the IEEE 802.11a, IEEE 802.11b, IEEE 80.2.11ac and/or 802.11b Wi-Fi standards. Implementations of device 600 may also be utilized in networks transmitting to wireless devices of the downlink according to the LTE OFDM system specified in the 3GPP standard "TS 36.211 Evolved Universal Terrestrial Radio Access (E-UTRA); Physical channels and modulation".

The example embodiments disclosed herein may be described in the general context of processor-executable code or instructions stored on memory that may comprise one or more computer readable storage media (e.g., tangible non-transitory computer-readable storage media such as memory 512, or 606). As should be readily understood, the terms "computer-readable storage media" or "non-transitory computer-readable media" include the media for storing of data, code and program instructions, such as memory 512, or 606, and do not include portions of the media for storing transitory propagated or modulated data communication signals. The term non-transitory computer readable media is used in this disclosure as comprising all computer-readable storage media, with the sole exception being a transitory, propagating signal. All forms of tangible computer readable storage media are included in non-transitory computer readable storage media.

Embodiments of Multiplexed Unequal Error Protection for Wireless Networks have been disclosed that include a device comprising one or more processors and memory in communication with the one or more processors. The memory includes code, which when executed causes the one or more processors to determine a reliability, the reliability associated with a first subcarrier and based on a position of the first subcarrier in a channel, the channel including the first and at least one second subcarrier, and, initiate allocation of data bits to the first subcarrier for data transmission based at least on the reliability and a priority associated with the data bits. The data bits may be associated with a modality of an application and the modality may define the priority associated with the data bits. The data bits may be the most significant bits of a data word and the most significant bits may define the priority associated with the data bits. The reliability of the first subcarrier may be associated with a middle position of the channel. Also, the first subcarrier may be determined to have a higher reliability than the least one second subcarrier based on the position of the at least one second subcarrier being an edge position of the channel. Also, the first subcarrier may be determined to have a higher reliability than the least one second subcarrier based on the position of the first subcarrier being in a position of the channel nearer the middle of the channel than a position of the at least one second subcarrier.

The code may be further executable to cause the one or more processors to determine a reliability of the first subcarrier by determining that a channel band adjacent to the channel is an open channel band, and, determining that the first subcarrier is in an edge position of the channel more adjacent to the open channel band relative to a position of the at least one second subcarrier. The data bits may comprise first data bits, the priority may comprise a first priority, and the reliability may comprise a first reliability, and the code may be further executable to cause the one or more processors to receive the first data bits and second data bits for the data transmission, the first and second data bits associated with the first and a second priority, respectively, determine a second reliability, the second reliability associated with a selected subcarrier of the at least one second subcarrier and based on the position of the selected subcarrier channel in the channel, and, allocate the first data bits to the first subcarrier for the data transmission based at least on the first priority and the first reliability, and allocate the second data bits to the selected subcarrier channel of the at least one second subcarrier for the data transmission based at least on the second priority and the second reliability. The first data bits and the second data bits may be received from a first and a second modality of an application, respectively, and the first modality and second modality may be associated with the first priority and second priority, respectively. The first data bits may be most significant bits of a data word and the second data bits may be least significant bits of the data word. Also, the reliability may comprise a first reliability, the channel may comprise a first channel and the code may be further executable to cause the one or more processors to determine a second reliability, the second reliability associated with a third subcarrier and based on a position of the third subcarrier in a second channel, and, allocate data bits for the data transmission to the first subcarrier of the first channel and the third subcarrier of the second channel, based at least on a priority associated with the data bits and the first and second reliability.

The disclosed embodiments also include a method comprising determining a reliability, the reliability associated with a first subcarrier and based at least on a position of the first subcarrier in a channel, and, initiating allocation of data bits to the first subcarrier for data transmission based at least on a priority associated with the data bits and the reliability. The determining a reliability associated with a first subcarrier may comprise determining a position of the first subcarrier relative to the position of at least one second subcarrier within the channel, and determining the reliability associated with the first subcarrier, the reliability based on the position of the first subcarrier. The determining a position of the first channel may comprise determining that a channel band adjacent to the channel is an open channel band, and, determining that the first subcarrier is in art edge position of the OFDM channel and closer to the open channel band relative to the position of the at least one second subcarrier. The position of the first subcarrier may be in a middle position of the channel. The determining a reliability may further comprise determining the first subcarrier has a higher reliability than the least one second OFDM subcarrier based on the position of the first subcarrier being in a position of the channel nearer the middle of the channel than the position of the at least one second subcarrier. The determining a reliability may also comprise determining that a channel band adjacent to the channel is an open channel band, and, determining that the first subcarrier is in an edge position of the channel more adjacent to the open channel band relative to a position of the at least one second subcarrier.

The disclosed embodiments further include a system comprising one or more devices, each device configured to transmit data on at least one channel comprising a plurality of subcarriers by associating a priority assigned to the data with a position of a selected subcarrier of the plurality of subcarriers within the at least one channel, and transmitting the data on the selected subcarrier. The at least one channel comprising a plurality of subcarriers may comprise at least one OFDM channel comprising a plurality of OFDM subcarriers. The priority assigned to the data may be a high priority and the position of the selected OFDM subcarrier may be a middle position of a plurality of positions of the plurality of OFDM subcarriers. The selected subcarrier may comprise a first selected subcarrier and each device may be configured to transmit the data by associating the priority assigned to the data with a position of a first and a second selected channel of the plurality of channels within the at least one channel, and transmitting the data on the first and second selected subcarrier. Further, the system may be a Wi-Fi system or the system may be an LTE system.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuit, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is meant to include all such implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may be combined with, or be replaced by, any suitable devices, components, architecture, or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A device comprising:
one or more processors; and,
memory in communication with the one or more processors, the memory including code, which when executed causes the one or more processors to:
determine that a frequency band adjacent to a channel assigned to the device is an open frequency band;
determine a first and a second reliability, the first reliability associated with a first subcarrier of the channel and based on a position of the first subcarrier in the channel, and the second reliability associated with at least one second subcarrier of the channel and based on a position of the at least one second subcarrier in the channel, wherein the first reliability is greater than the second reliability based on the open frequency band being closer to the position of the first subcarrier than to the position of the at least one second subcarrier; and,
initiate allocation of one or more data bits to the first subcarrier and the at least one second subcarrier for data transmission based at least on the first and second reliability and a priority associated with each of the one or more data bits.

2. The device of claim 1, wherein the data bits are associated with a modality of an application and the modality defines the priority associated with the data bits.

3. The device of claim 1, wherein the data bits are most significant bits of a data word and the most significant bits define the priority associated with the data bits.

4. The device of claim 1, wherein the device operates in a network and the code controls the one or more processors to determine that the frequency band adjacent to a channel assigned to the device is an open frequency band by controlling the one or more processors to receive information from a network coordinating function associated with another network, and determine that the frequency band is open based on the received information.

5. The device of claim 1, wherein the code controls the one or more processors to determine that the frequency band adjacent to a channel assigned to the device is an open frequency band by controlling the one or more processors to monitor data associated with the frequency band over a time period and determine that the frequency band is open based on the monitored data.

6. The device of claim 1, wherein the device comprises a network access device.

7. The device of claim 1, wherein the device comprises a mobile device.

8. The device of claim 1, wherein the data bits comprise first data bits, the priority comprises a first priority, and the code is further executable to cause the one or more processors to:
receive the first data bits and second data bits for the data transmission, the first and the second data bits associated with the first priority and a second priority, respectively; and,
allocate the first data bits to the first subcarrier for the data transmission based at least on the first priority and the first reliability, and allocate the second data bits to a selected subcarrier channel of the at least one second subcarrier for the data transmission based at least on the second priority and the second reliability.

9. The device of claim 8, wherein the first data bits and the second data bits are received from a first and a second modality of an application, respectively, and the first modality and second modality are associated with the first priority and second priority, respectively.

10. The device of claim 8, wherein the first data bits are most significant bits of a data word and the second data bits are least significant bits of the data word.

11. The device of claim 1, wherein the channel comprises a first channel and the code is further executable to cause the one or more processors to:
determine a third reliability, the third reliability associated with a third subcarrier and based on a position of the third subcarrier in a second channel; and,
allocate data bits for the data transmission to the first subcarrier and the at least one second subcarrier of the first channel and the third subcarrier of the second channel, based at least on a priority associated with the data bits and the first, second, and third reliability.

12. A method comprising:
determining that a frequency band adjacent to a channel assigned to a device is an open frequency band;
determining a first and a second reliability, the first reliability associated with a first subcarrier of the channel and based at least on a position of the first subcarrier in the channel, and the second reliability associated with at least one second subcarrier of the channel and based on a position of the at least one second subcarrier in the channel, wherein the first reliability is greater than the second reliability based on the open frequency band being closer to the position of the first subcarrier than to the position of the at least one second subcarrier; and,
initiating allocation of one or more data bits to the first subcarrier and the at least one second subcarrier for data transmission based at least on the first and second reliability and a priority associated with each of the of one or more data bits.

13. The method of claim 12, wherein the data bits are associated with a modality of an application and the modality defines the priority associated with the data bits.

14. The method of claim 13, wherein the data bits are most significant bits of a data word and the most significant bits define the priority associated with the data bits.

15. The method of claim 12, wherein the position of the first subcarrier is a position of the channel adjacent to the open frequency band.

16. The method of claim 12, wherein the device operates in a network and the determining that a frequency band adjacent to a channel assigned to the device is an open frequency band comprises receiving information from a network coordinating function associated with another network.

17. The method of claim 12, wherein the determining that a frequency band adjacent to a channel assigned to the device is an open frequency band comprises monitoring the frequency band over a time period and making the determination based on information from the monitoring.

18. A device comprising:
one or more processors; and,
memory in communication with the one or more processors, the memory including code, which when executed causes the one or more processors to:
determine a first reliability, the first reliability associated with a first subcarrier and based on position of the first subcarrier in a first channel, the first channel including the first subcarrier and at least one second subcarrier;

determine a second reliability, the second reliability associated with a third subcarrier and based on a position of the third subcarrier in a second channel; and, initiate allocation of data bits to the first subcarrier of the first channel and the third subcarrier of the second channel for transmission based at least on a priority associated with the data bits and the first and second reliability.

19. The device of claim 18, wherein the first channel and the second channel each comprise an orthogonal frequency division multiplexed (OFDM) channel comprising a plurality of OFDM subcarriers.

20. The device of claim 19, wherein the priority assigned to the data bits is a high priority, and the position of the first subcarrier is a middle position of the first channel and the position of the second subcarrier is a middle position of the second channel.

21. The device of claim 18, wherein the device is configured to operate in a Wi-Fi system.

22. The device of claim 18, wherein the device is configured to operate in an LTE system.

* * * * *